(12) United States Patent
Fan et al.

(10) Patent No.: US 11,500,606 B2
(45) Date of Patent: Nov. 15, 2022

(54) AR DISPLAY DEVICE AND METHOD

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Qingwen Fan, Beijing (CN); Jinghua Miao, Beijing (CN); Xuefeng Wang, Beijing (CN); Shuai Hao, Beijing (CN); Shuo Zhang, Beijing (CN); Huidong He, Beijing (CN); Hao Zhang, Beijing (CN); Lili Chen, Beijing (CN)

(73) Assignees: BEIJING BOE OPTOELECTRONICS TECHNOLOGY CO., LTD., Beijing (CN); BEIJING BOE TECHNOLOGY DEVELOPMENT CO., LTD., Beijing (CN)

(*) Notice: Subject to any disclaimer, the term of this patent is extended or adjusted under 35 U.S.C. 154(b) by 53 days.

(21) Appl. No.: 17/036,792

(22) Filed: Sep. 29, 2020

(65) Prior Publication Data
US 2021/0124547 A1    Apr. 29, 2021

(30) Foreign Application Priority Data

Oct. 28, 2019  (CN) .......................... 201911028259.6

(51) Int. Cl.
*G06F 3/14*     (2006.01)
*H04L 67/02*    (2022.01)
*H04L 65/65*    (2022.01)

(52) U.S. Cl.
CPC .......... *G06F 3/1454* (2013.01); *G06F 3/1423* (2013.01); *H04L 65/65* (2022.05); *H04L 67/02* (2013.01)

(58) Field of Classification Search
None
See application file for complete search history.

(56) References Cited

U.S. PATENT DOCUMENTS

| 8,965,460 | B1* | 2/2015 | Rao ..................... H04N 1/00307 455/566 |
| 2014/0160055 | A1* | 6/2014 | Margolis ............... G06F 1/1684 345/174 |
| 2015/0067580 | A1* | 3/2015 | Um ........................ G06F 3/048 715/781 |
| 2017/0287215 | A1* | 10/2017 | Lalonde ............... G02B 27/017 |
| 2018/0197624 | A1* | 7/2018 | Robaina .................. G06F 3/013 |
| 2018/0242920 | A1* | 8/2018 | Hresko ............. G06K 9/00718 |
| 2019/0371028 | A1* | 12/2019 | Harrises ............. G02B 27/0172 |
| 2020/0327670 | A1* | 10/2020 | Connor ................. G06T 19/006 |
| 2021/0057070 | A1* | 2/2021 | Ferguson, III .......... G06T 11/60 |

* cited by examiner

Primary Examiner — Toan H Vu
(74) Attorney, Agent, or Firm — Kinney & Lange, P.A.

(57) ABSTRACT

The embodiments of the present disclosure provide an AR display device and method. The device includes a terminal and an AR wearable device. The terminal is configured to: configure the AR wearable device as an extended display device of the terminal to put the AR wearable device and a display screen of the terminal in a dual-screen heterogeneous display mode; and transmit image data to the AR wearable device to allow the AR wearable device to display the image data.

13 Claims, 1 Drawing Sheet

AR DISPLAY DEVICE AND METHOD

CROSS-REFERENCE TO RELATED APPLICATION

This application claims the priority of the Chinese patent application 201911028259.6 filed on Oct. 28, 2019, which is incorporated herein by reference.

TECHNICAL FIELD

The embodiments of the present disclosure relate to the display field, and particularly to an AR display device and a method.

BACKGROUND

AR (Augmented Reality) is a technology that calculates the position and angle of the image captured by the camera in real-time and adds the corresponding image. AR not only displays real-world information, but also displays virtual information at the same time. The two types of information complement each other. In visual augmented reality technology, users use AR wearable devices to combine the real world with computer graphics. For example, in a scenario where a lecturer uses a projection PPT to give a presentation, the lecturer often needs to turn his back to the audience to view the PPT page of the projection screen during the presentation, which affects the effect of the presentation and the interaction between the lecturer and the audience.

SUMMARY

The embodiments of the present disclosure provide an AR display device and a method.

According to first aspect of the embodiments of the present disclosure, there is provided an AR display device, comprising: a terminal; and an AR wearable device; wherein the terminal is configured to: configure the AR wearable device as an extended display device of the terminal to put the AR wearable device and a display screen of the terminal in a dual-screen heterogeneous display mode; and transmit image data to the AR wearable device to allow the AR wearable device to display the image data.

For example, the terminal is further configured to acquire streaming media data and process the acquired streaming media data into the image data.

For example, the AR display device further comprises a computing device configured to transmit the streaming media data to the terminal in response to a request from the terminal.

For example, the streaming media data comprises Real-Time Streaming Protocol RTSP streaming media data.

For example, the computing device is further configured to transmit the streaming media data to the terminal in response to a request from the terminal by: transmitting the RTSP streaming media data for a URL address contained in the request to the terminal in response to the request containing the URL address from the terminal.

For example, the terminal is further configured to configure the AR wearable device as an extended display device of the terminal by: instantiating a Presentation class; acquiring a display buffer of the AR wearable device through a DisplayManager service in the Presentation class; creating a layout file for image data, adding a TextureView component to the layout file, and displaying the image data in the TextureView component; and transmitting the image data displayed in the TextureView component to the display buffer of the AR wearable device.

For example, the terminal is further configured to configure the AR wearable device as an extended display device of the terminal by: instantiating a Presentation class; acquiring a display buffer of the AR wearable device through a DisplayManager service in the Presentation class; creating a layout file according to the display buffer, adding a TextureView component to the layout file, and displaying the image data in the TextureView component obtained by processing the received streaming media data from the computing device; and transmitting the image data displayed in the TextureView component to the display buffer of the AR wearable device.

For example, the streaming media data comprises streaming media data obtained by performing real-time screen recording on a display screen of the computing device.

According to second aspect of the embodiments of the present disclosure, there is provided an AR display method applied in the AR display device described above, the method comprises: configuring by the terminal, an AR wearable device as an extended display device of the terminal to put the AR wearable device and a display screen of the terminal in a dual-screen heterogeneous display mode; and transmitting by the terminal, image data to the AR wearable device to allow the AR wearable device to display the image data.

For example, the method further comprising: processing by the terminal, acquired streaming media data into the image data.

For example, the method further comprising: transmitting by a computing device, the streaming media data to the terminal in response to a request transmitted from the terminal.

For example, the streaming media data is RTSP streaming media data.

For example, the transmitting by a computing device, the streaming media data to the terminal in response to a request transmitted from the terminal further comprising: transmitting the RTSP streaming media data for the URL address contained in the request to the terminal in response to the request containing a URL address transmitted from the terminal.

For example, the configuring by the terminal, an AR wearable device as an extended display device of the terminal to put the AR wearable device and a display screen of the terminal in a dual-screen heterogeneous display mode, and transmitting by the terminal, image data to the AR wearable device to allow the AR wearable device to display the image data further comprises: instantiating a Presentation class; acquiring a display buffer of the AR wearable device through a DisplayManager service in the Presentation class; creating a layout file for image data, adding a TextureView component to the layout file, and displaying the image data in the TextureView component; and transmitting the image data displayed in the TextureView component to the display buffer of the AR wearable device.

For example, the configuring by the terminal, an AR wearable device as an extended display device of the terminal to put the AR wearable device and a display screen of the terminal in a dual-screen heterogeneous display mode, and transmitting by the terminal, image data to the AR wearable device to allow the AR wearable device to display the image data further comprises: instantiating a Presentation class; acquiring a display buffer of the AR wearable device through a DisplayManager service in the Presentation class; creating a layout file for the image data, adding a TextureView component to the layout file, and displaying the image data in the TextureView component obtained by processing the received streaming media data from the computing device; and transmitting the image data displayed in the TextureView component to the display buffer of the AR wearable device.

For example, the streaming media data is streaming media data screen recorded in real-time on a display screen of the computing device.

According to third aspect of the embodiments of the present disclosure, there is provided a non-transitory computer storage medium of storing a computer program that, when executed, executes the method described above.

BRIEF DESCRIPTION OF THE DRAWINGS

The specific implementations of the embodiments of the present disclosure will be described in further detail below in conjunction with the accompanying drawings, in which.

DETAILED DESCRIPTION OF EMBODIMENTS

Figure 1:
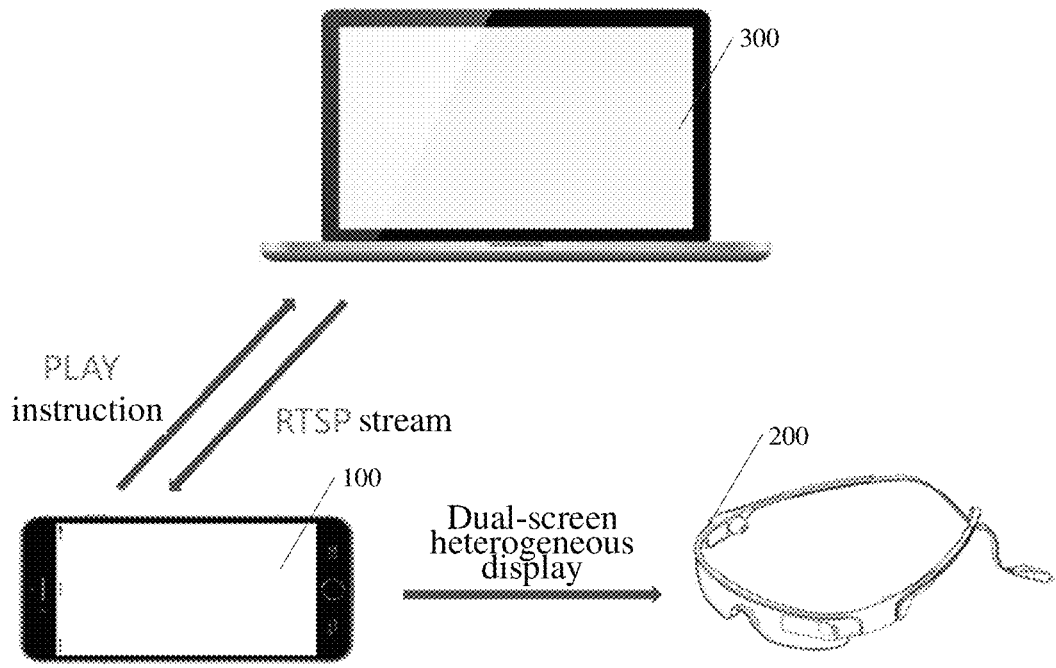
FIG. 1 shows a schematic diagram of an AR display device according to an embodiment of the present disclosure.

In order to describe the embodiments of the present disclosure more clearly, the following further describes the embodiments of the present disclosure in conjunction with preferred embodiments and the accompanying drawings. Similar components in the drawings are denoted by the same reference numerals. Those skilled in the art should understand that the content specifically described below is illustrative rather than restrictive, and should not be used to limit the protection scope of the embodiments of the present disclosure.

An embodiment of the present disclosure provides an AR display device. As shown in FIG. 1, the AR display device includes a terminal 100 and an AR wearable device 200. The terminal 100 configures the AR wearable device 200 as an extended display device of the terminal 100 to put the AR wearable device 200 and the display screen of the terminal 100 in a dual-screen heterogeneous display mode, and transmits image data to the AR wearable device 200 to allow the AR wearable device 200 to display the image data.

The AR display device provided according to this embodiment is suitable for a variety of AR display scenarios, for example, it is applied to a scenario that uses a projection PPT to give a presentation. The lecturer does not need to turn his back to the audience to view the PPT page of the projection screen during the presentation, but may view the PPT page when facing the audience with the help of the AR wearable device 200. In addition, the dual-screen heterogeneous display mode may prevent the terminal 100 from being mistakenly touched by a user in a role such as a lecturer and causing a display error of the AR wearable device 200, and it does not affect the display content of the AR wearable device 200 when the terminal 100 is mistakenly touched by a user in a role such as a lecturer. The device buttons such as a POWER button (power key) and a HOME button of the terminal 100 are high-privileged buttons that may not be rewritten and shielded at the application layer. Therefore, the dual-screen heterogeneous display mode may prevent the POWER button, a return button, a HOME button, or a volume adjustment button of the terminal 100 from being mistakenly touched by a user in a role such as a lecturer, causing the AR wearable device 200 to display errors.

For example, the terminal 100 processes the acquired streaming media data into image data.

For example, the AR display device further includes a computing device 300. The computing device 300 transmits streaming media data to the terminal 100 in response to the request transmitted from the terminal 100.

By adopting the foregoing implementation manner, the AR wearable device 200 may display the image data obtained after the terminal 100 processes the streaming media data from the computing device 300 in real-time, which is suitable for the scenarios described above that are applied to presentations by means of a projection PPT. For example, the PPT page projected by the projector is a PPT page displayed on the screen of the computing device 300, that is, the projection screen of the projector is the display screen interface of the computing device 300, and the projector and the computing device 300 may be understood as dual-screen simultaneous display, and the display screen interface of the computing device 300 is synchronized to the projector for projection.

Where the terminal 100 may be various electronic devices, including but not limited to smart phones, smart watches, personal digital assistants, and so on. The computing device 300 may perform processing such as storage and analysis on the received data, and feedback the processing result to the terminal 100. The terminal 100 and the computing device 300, and the terminal 100 and the AR wearable device 200 respectively communicate through a network, and the network may include various connection types, such as wired, wireless communication links, or fiber optic cables. In an example, the AR wearable device 200 is an AR headset, and further, is AR glasses.

In a scenario where the AR display device is applied to a presentation by means of a projected PPT, the terminal 100 and the AR wearable device 200 are wired connected by a data line. This is because the lecturer may carry the terminal 100 with him, so the wired connection between the terminal 100 and the AR wearable device 200 by using a data line may allow the AR wearable device 200 not to be equipped with a wireless transmission module. In addition, the wired transmission speed is fast and stable; and a wireless connection adopted between the terminal 100 and the computing device 300 allows the lecturer to move freely. Further, the terminal 100 and the computing device 300 access the same Wifi network to ensure the speed and stability of data transmission between the terminal 100 and the computing device 300.

For example, the streaming media data is RTSP streaming media data. Streaming media data based on RTSP (Real Time Streaming Protocol) may be effectively transmitted through an IP network.

For example, transmitting by the computing device 300, the streaming media data to the terminal 100 in response to a request transmitted from the terminal 100 further includes: transmitting by the computing device 300, an RTSP streaming media data for a URL address contained in the request to the terminal 100 in response to the request containing the URL address transmitted from the terminal 100. Further, the computing device 300 packages the RTSP streaming media data into UDP data packets and transmits the same to the terminal 100.

For example, configuring by the terminal 100, the AR wearable device 200 as an extended display device of the terminal 100 to put the AR wearable device 200 and the display screen of the terminal 100 in a dual-screen heterogeneous display mode, and transmitting by the terminal 100, image data to the AR wearable device 200 to allow the AR wearable device 200 to display the image data further includes the following. The terminal 100 instantiates the Presentation class; the terminal 100 acquires the display buffer of the AR wearable device 200 through the DisplayManager service in the Presentation class; the terminal 100 creates a layout file for the image data, adds TextureView component to the layout file, and displays image data in the TextureView component; and the terminal 100 transmits the image data displayed in the TextureView component to the display buffer of the AR wearable device 200, so that the AR wearable device 200 displays the image data.

For example, in the case that the above described AR display device further includes the computing device 300, configuring by the terminal 100, the AR wearable device 200 as an extended display device of the terminal 100 to put the AR wearable device 200 and the display screen of the terminal 100 in a dual-screen heterogeneous display mode further includes the following. The terminal 100 instantiates the Presentation class; the terminal 100 acquires the display buffer of the AR wearable device 200 through the DisplayManager service in the Presentation class; the terminal 100 creates a layout file for the image data, and adds the TextureView component to the layout file and displays image data in the TextureView component obtained by processing the received streaming media data from the computing device 300; and the terminal 100 transmits the image data displayed in the TextureView component to the display buffer of the AR wearable device 200, so that the AR wearable device 200 displays the image data.

With the above implementation, the terminal 100 may efficiently and conveniently configure the AR wearable device 200 as an extended display device of the terminal 100, so that the AR wearable device 200 and the display screen of the terminal 100 are in a dual-screen heterogeneous display mode.

In a specific example, according to an embodiment of the present disclosure, a streaming media server is built on a computing device 300 (for example, a PC side or a server side), and a URL address is output to the terminal 100 (AP side, the role of the device is the client) to facilitate the terminal 100 to acquire the streaming media data. Where the generation of the URL address indicates that the streaming media server of the computing device 300 for pushing the streaming media data is successfully configured, and the streaming media server of the computing device 300 waits for a response after the configuration is successful. In addition, the streaming media server may also be built directly in the terminal 100, and the user may choose according to the data to be synchronized.

The terminal 100 may set the AR wearable device 200 to a dual-screen heterogeneous display mode through software settings in response to a user operation. For example, the terminal 100 instantiates the Presentation class of Android, where the Presentation class may provide an area where the application may display different UIs (user interfaces) on the auxiliary display screen; the terminal 100 acquires the display buffer of the AR wearable device 200 through the DisplayManager service in the Presentation class, where the display buffer size may be set through the management class, that is, display parameters such as the display screen size and resolution are adjusted; the terminal 100 creates a layout file for the image data, adds the TextureView component to the layout file, and displays image data in the TextureView component obtained by processing the received streaming media data from the computing device 300; and the terminal 100 transmits the image data displayed in the TextureView component to the display buffer of the AR wearable device 200, so that the AR wearable device 200 displays the image data.

When the terminal 100 is deployed, the user is prompted to input an URL address of the streaming media data. After responding to the URL address provided by the computing device 300 inputted by the user, the user is prompted to successfully connect to the computing device 300. After that, the terminal 100 parses out the IP and port number through the URL and transmits a PLAY request. Meanwhile, it starts the RTSP client at the designated port and prepares to receive UDP data. The computing device 300 starts to pack UDP data packets (RTSP streaming media data) after receiving the PLAY request transmitted from the terminal 100. After receiving the UDP data packet, the terminal 100 performs packet grouping and retransmission control, and after processing into image data, the image data is displayed (played) in the TextureView component to allow the AR wearable device 200 to display the image data. During the display process, the terminal 100 may stop the above described display process (run) in response to the user's interruption operation, and continue to display if the user does not perform the interruption operation.

For example, the streaming media data may be streaming media data obtained by performing real-time screen recording on the display screen of the computing device 300. This implementation is applicable to the scenario where the above described AR display device is applied to presentations by means of a projection PPT.

For example, the computing device 300 in the AR display device provided in this embodiment also performs image processing on the image data returned by the AR wearable device 200 through the terminal 100, and transmits the processed image data to the AR wearable device 200 through the terminal 100. The AR wearable device 200 is caused to display the processed image data. This implementation may utilize the relatively powerful data processing capabilities of the computing device 300 to implement applications such as image recognition, making the application field of AR technology broader. When in the scenario where the AR display device is applied to presentations by means of a projection PPT, this implementation may realize a marking of the live images collected by the AR wearable device 200 through its camera. In addition, when only simple image processing is required and the calculation performance is not high, the terminal 100 may also perform image processing.

Figure 2:
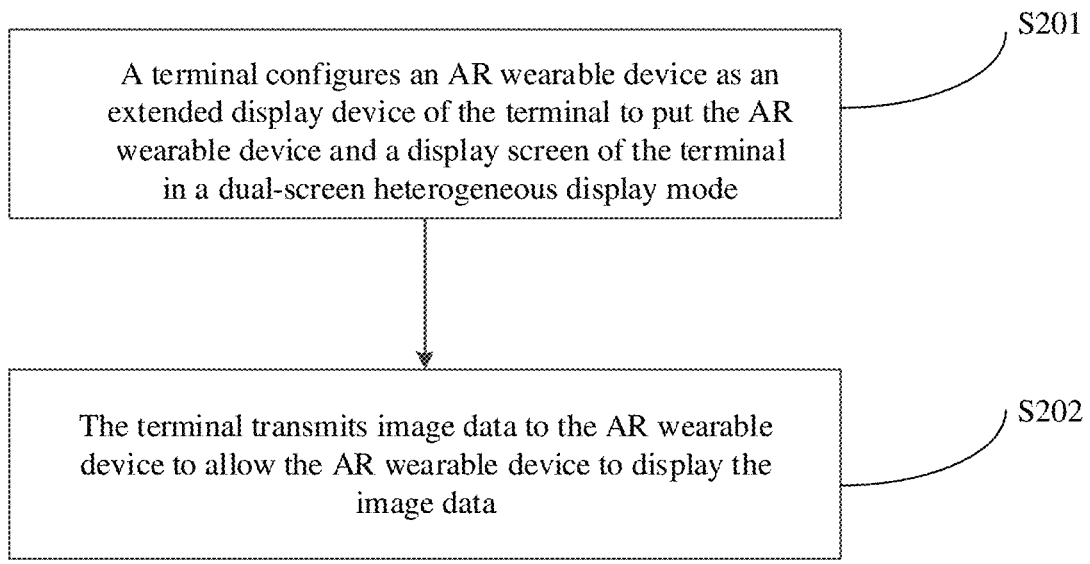
FIG. 2 shows a flowchart of an AR display method according to an embodiment of the present disclosure.

As shown in FIG. 2, another embodiment of the present disclosure provides an AR display method, which includes the following steps.

In step S201, the terminal configures the AR wearable device as an extended display device of the terminal to put the AR wearable device and the display screen of the terminal in a dual-screen heterogeneous display mode.

In step S202, the terminal transmits the image data to the AR wearable device to allow the AR wearable device to display the image data.

For example, the method further includes: processing by the terminal, acquired streaming media data into image data.

For example, the method further includes: transmitting by the computing device, the streaming media data to the terminal in response to a request transmitted from the terminal.

For example, the streaming media data is RTSP streaming media data. The streaming media data based on RTSP may be effectively transmitted through the IP network.

For example, transmitting by the computing device, the streaming media data to the terminal in response to a request transmitted from the terminal further includes: transmitting by the computing device, an RTSP streaming media data for a URL address contained in the request to the terminal in response to the request containing the URL address transmitted from the terminal.

For example, configuring by the terminal, the AR wearable device as an extended display device of the terminal to put the AR wearable device and the display screen of the terminal in a dual-screen heterogeneous display mode, and transmitting by the terminal, image data to the AR wearable device to allow the AR wearable device to display the image data further includes: instantiating a Presentation class; acquiring a display buffer of the AR wearable device through a DisplayManager service in the Presentation class; creating a layout file for the image data, adding a TextureView component to the layout file, and displaying the image data in the TextureView component; and transmitting the image data displayed in the TextureView component to the display buffer of the AR wearable device.

For example, configuring by the terminal, the AR wearable device as an extended display device of the terminal to put the AR wearable device and the display screen of the terminal in a dual-screen heterogeneous display mode, and transmitting by the terminal, image data to the AR wearable device to allow the AR wearable device to display the image data further includes: instantiating a Presentation class; acquiring a display buffer of the AR wearable device through a DisplayManager service in the Presentation class; creating a layout file for the image data, adding a TextureView component to the layout file, and displaying the image data in the TextureView component obtained by processing the received streaming media data from the computing device; and transmitting the image data displayed in the TextureView component to the display buffer of the AR wearable device.

For example, the streaming media data is streaming media data obtained by performing real-time screen recording on the display screen of the computing device.

It should be noted that the AR display method provided in this embodiment is similar to the principle and work flow of the AR display device described above, and the relevant parts may be referred to the above description, which will not be repeated here.

In the description of the embodiments of the present disclosure, the terms "including", "comprising" or any other variations thereof are intended to cover non-exclusive inclusion, so that a process, a method, an article, or a device including a series of elements not only includes those elements, but also includes other elements not explicitly listed, or includes elements inherent to the process, the method, the article, or the device. If there are no more restrictions, the element defined by the sentence "including a . . . " does not exclude the existence of other same elements in the process, the method, the article, or the device including the element.

The above described embodiments of the embodiments of the present disclosure are merely examples to clearly illustrate the embodiments of the present disclosure, and are not intended to limit the implementation of the embodiments of the present disclosure. For those of ordinary skill in the art, other different forms of changes or modifications may be made on the basis of the above description. It is not possible to list all the implementations here. Any obvious changes or modifications derived from the technical solutions of the embodiments of the present disclosure are still in the scope of protection of the embodiments of the present disclosure.

What is claimed is:

1. An Augmented Reality (AR) display device, comprising:
a terminal; and
an AR wearable device,
wherein the terminal is configured to:
configure the AR wearable device as an extended display device of the terminal to put the AR wearable device and a display screen of the terminal in a dual-screen heterogeneous display mode; and
transmit image data to the AR wearable device to allow the AR wearable device to display the image data;
wherein the terminal is further configured to acquire streaming media data and process the acquired streaming media data into the image data;
wherein the AR display device further comprises a computing device configured to transmit the streaming media data to the terminal in response to a request from the terminal;
wherein the streaming media data comprises Real-Time Streaming Protocol (RTSP) streaming media data; and
wherein the computing device is further configured to transmit the streaming media data to the terminal in response to a request from the terminal by transmitting the RTSP streaming media data for a URL address contained in the request to the terminal in response to the request containing the URL address from the terminal.

2. The device according to claim 1, wherein the terminal is further configured to configure the AR wearable device as an extended display device of the terminal by:
instantiating a Presentation class;
acquiring a display buffer of the AR wearable device through a DisplayManager service in the Presentation class;
creating a layout file for image data, adding a TextureView component to the layout file, and displaying the image data in the TextureView component; and
transmitting the image data displayed in the TextureView component to the display buffer of the AR wearable device.

3. The device according to claim 1, wherein the terminal is further configured to configure the AR wearable device as an extended display device of the terminal by:
instantiating a Presentation class;
acquiring a display buffer of the AR wearable device through a DisplayManager service in the Presentation class;
creating a layout file according to the display buffer, adding a TextureView component to the layout file, and displaying the image data in the TextureView component obtained by processing the received streaming media data from the computing device; and
transmitting the image data displayed in the TextureView component to the display buffer of the AR wearable device.

4. The device according to claim 1, wherein the streaming media data comprises streaming media data obtained by performing real-time screen recording on a display screen of the computing device.

5. An AR display method applied in the AR display device according to claim 1, the method comprising:

configuring, by the terminal, the AR wearable device as an extended display device of the terminal to put the AR wearable device and a display screen of the terminal in a dual-screen heterogeneous display mode; and transmitting, by the terminal, image data to the AR wearable device to allow the AR wearable device to display the image data.

6. The method according to claim 5, further comprising:
processing, by the terminal, acquired streaming media data into the image data.

7. The method according to claim 6, further comprising:
transmitting, by a computing device, the streaming media data to the terminal in response to a request transmitted from the terminal.

8. The method according to claim 6, wherein the streaming media data is RTSP streaming media data.

9. The method according to claim 7, wherein the transmitting, by a computing device, the streaming media data to the terminal in response to a request transmitted from the terminal further comprises:

transmitting the RTSP streaming media data for the URL address contained in the request to the terminal in response to the request containing a URL address transmitted from the terminal.

10. The method according to claim 5, wherein the configuring, by the terminal, the AR wearable device as an extended display device of the terminal to put the AR wearable device and a display screen of the terminal in a dual-screen heterogeneous display mode, and transmitting, by the terminal, image data to the AR wearable device to allow the AR wearable device to display the image data further comprises:

instantiating a Presentation class;

acquiring a display buffer of the AR wearable device through a DisplayManager service in the Presentation class;

creating a layout file for image data, adding a TextureView component to the layout file, and displaying the image data in the TextureView component; and transmitting the image data displayed in the TextureView component to the display buffer of the AR wearable device.

11. The method according to claim 7, wherein the configuring, by the terminal, the AR wearable device as an extended display device of the terminal to put the AR wearable device and a display screen of the terminal in a dual-screen heterogeneous display mode, and transmitting, by the terminal, image data to the AR wearable device to allow the AR wearable device to display the image data further comprises:

instantiating a Presentation class;

acquiring a display buffer of the AR wearable device through a DisplayManager service in the Presentation class;

creating a layout file for the image data, adding a TextureView component to the layout file, and displaying the image data in the TextureView component obtained by processing the received streaming media data from the computing device; and transmitting the image data displayed in the TextureView component to the display buffer of the AR wearable device.

12. The method according to claim 7, wherein the streaming media data is streaming media data screen recorded in real-time on a display screen of the computing device.

13. A non-transitory computer storage medium storing a computer program that, when executed, executes the method according to claim 5.

* * * * *